United States Patent [19]

Yamagami et al.

[11] Patent Number: 5,684,772
[45] Date of Patent: Nov. 4, 1997

[54] MAGNETO-OPTICAL DISC RECORDING AND REPRODUCING SYSTEM WITH LEVEL CLAMPING

[75] Inventors: Tamotsu Yamagami, Kanagawa; Tetsuji Kawashima, Chiba, both of Japan

[73] Assignee: Sony Corporation, Tokyo, Japan

[21] Appl. No.: 468,234

[22] Filed: Jun. 6, 1995

Related U.S. Application Data

[63] Continuation of Ser. No. 187,117, Jan. 25, 1994, abandoned, which is a continuation of Ser. No. 884,702, May 18, 1992, abandoned.

[30] Foreign Application Priority Data

May 24, 1991 [JP] Japan .................... 3-148212

[51] Int. Cl.$^6$ ................................................ G11B 7/00
[52] U.S. Cl. ................... 369/59; 369/48; 369/124
[58] Field of Search ....................... 369/13, 124, 110, 369/111, 59, 48

[56] References Cited

U.S. PATENT DOCUMENTS

| | | | |
|---|---|---|---|
| 4,706,236 | 11/1987 | Yoda | 369/59 |
| 4,961,182 | 10/1990 | Saito et al. | 369/124 |
| 5,107,473 | 4/1992 | Fuji et al. | 369/32 |
| 5,189,650 | 2/1993 | Watanabe et al. | 369/13 |

OTHER PUBLICATIONS

The Complete Handbook of Magnetic Recording, by Finn Jorgensen, McGraw Hill Inc., 1988, p. 507 (Fig 22-20).

*Primary Examiner*—Robert Pascal
*Assistant Examiner*—Arnold Kinkead
*Attorney, Agent, or Firm*—Limbach & Limbach, LLP

[57] ABSTRACT

A system of recording/reproducing data on and from a spiral or concentric track formed on a magneto-optical disc, in which a data recording area of the track is divided into a predetermined number of blocks. A reference data recording area is provided at a predetermined position of each of the blocks, in which continuous several bit data each of a high or low level is recorded, and, upon reproducing, a reproduced radio frequency signal is clamped at a signal level serving as a clamping level which is obtained by reproducing the data on the reference data recording area.

6 Claims, 5 Drawing Sheets

MAGNETO-OPTICAL DISC RECORDING AND REPRODUCING SYSTEM WITH LEVEL CLAMPING

This is a continuation of application Ser. No. 08/187,117 filed on Jan. 25, 1994, now abandoned, which is a continuation of application Ser. No. 07/884,702, filed on May 18, 1992 now abandoned).

BACKGROUND OF THE INVENTION

1. Field of the Invention

The present invention generally relates to data recording/reproducing systems for discs and, more particularly, is directed to a data recording/reproducing system for a magneto-optical disc which is useful in case of recording and reproducing data on and from the disc whose recording surface is made of a recording material sensitive to light.

2. Description of the Related Art

In a conventional optical disc apparatus, a laser beam is irradiated on an optical disc to record various data thereon in the form of spiral tracks and then the recorded data can be read out from the disc.

As data recording/reproducing methods of such optical disc apparatus, there have been known a continuous tracking method and a sample servo tracking method.

In the continuous tracking method, tracks for arranging data on the disc are formed by pregrooves. In the sample servo tracking method, tracks for arranging data on the disc are formed by sample servo pits arranged discretely.

FIG. 1 of the accompanying drawings shows an example of a format formed on a magneto-optical disc wherein recording tracks are formed by the sample servo pits. Referring to FIG. 1, each track is divided into, for example, 42 sectors S1 to S42 along the circumferential direction of the disc.

In each sector of the track, address data is recorded on an address data area AD, and then data is divided and recorded on succeeding data area having 32 blocks, that is, segments SG1 to SG32 each recording 18 byte data thereon, as shown in FIG. 2A.

FIG. 2B of the accompanying drawings shows an enlarged view of each segment shown in FIG. 2A. According to FIG. 2B, each segment includes a servo byte SB of 2 bytes at a head portion of the segment and succeedingly a data byte DB of 16 bytes each provided in the pregroove.

In the servo byte SB, at least a pair of wobbling pits P1, P2 and a clock pit P3 are formed in advance by an embossing processing or the like. The wobbling pits P1 and P2 are deviated to outer and inner peripheral sides from the center of a track T, respectively, while the clock pit P3 is disposed on the center of the track T.

A mirror surface or mirror mark M is formed on the track T between the clock pit P3 and the wobbling pits P1, P2. On the basis of a laser beam reflected from the mirror surface M, a focus servo signal is detected and an output power of the laser beam can be controlled.

According to the thus constituted magneto-optical disc, usually a tracking error signal is formed by operating light intensities of the reflection beams when the wobbling pits P1 and P2 are detected at sampling timing points t1 and t2, respectively, and further a clock signal is formed on the basis of the reflection beam when the clock pit P3 is detected at a sampling timing point t3.

When the laser beam is irradiated on the recording layer of the magneto-optical disc along the track thereof and a magnetic field is applied to the magneto-optical disc from the other side thereof, if the temperature of the recording layer increases not less than the Curie point, the recording layer is magnetized in the direction along which the magnetic field is applied thereto and then data are recorded therein.

In case of reading out information from the magneto-optical disc where the data is recorded, a reflected laser beam from the disc is detected by utilizing the magnetic Kerr effect to read the recorded data, thereby obtaining a reproduced radio frequency (RF) signal.

The reproduced RF signal is binarized through a waveform shaping process to thereby read the recorded data.

In the process of detecting the binary data on the basis of the reproduced RF signal read out from the disc, a level of the reproduced RF signal is directly digitized by an analog-to-digital (A/D) converter, then various kinds of clock signals are generated in a digital signal state, then the extraction of the recorded data from the digital data or the like is performed.

However, when material of the recording layer and reflectivity of the disc or the like are different at every disc, a level of the reproduced RF signal fluctuates at every disc due to various factors, so that a level of the reproduced RF signal may fall largely out of the dynamic range of the A/D converter.

In particular, when the recording data is coded by a non-return to zero inverted (NRZI) coding scheme, for example, in order to record the data at a high density, a DC component is superimposed on the reproduced RF signal.

If the DC component fluctuates, a DC offset component of the reproduced RF signal also fluctuates at every disc, so that the level of the reproduced RF signal is not always within the dynamic range of the A/D converter even if a gain of the reproduced RF signal is determined. Thus, it becomes difficult to obtain the reproduced digital signal which is obtained by effectively and fully utilizing the dynamic range of the A/D converter.

In order to obviate this problem, in a conventional read only memory (ROM) disc or the like, a level of the reflected beam from its mirror surface portion etc. having a predetermined reflectivity is picked up and then the reproduced RF signal is clamped at the picked-up level. However, in the magneto-optical disc, any reference for the clamp level cannot be obtained because a level of the reflection beam does not represent some one level of the binary signal.

OBJECTS AND SUMMARY OF THE INVENTION

Therefore, it is an object of the present invention to provide an improved data recording/reproducing system for a magneto-optical disc in which the aforementioned shortcomings and disadvantages encountered with the prior art can be eliminated.

More specifically, it is an object of the present invention to provide a data recording/reproducing system for a magneto-optical disc which can accurately digitize a reproduced RF signal even if the disc is of a type wherein a DC component is superimposed on the reproduced RF signal.

As an aspect of the present invention, a system of recording/reproducing data on and from a spiral or concentric track formed on a magneto-optical disc, in which a data recording area of the track is divided into a predetermined number of blocks, the system is comprised of means for providing a reference data recording area at a predetermined position of each of the blocks, in which continuous several bit data indicative of a high or low level are recorded, and means for clamping a reproduced radio frequency signal at a signal level serving as a clamping level which is obtained by reproducing the data on the reference data recording area.

Namely, according to an example of the present invention, a reference data recording area in which continuous several bit data each representing "1" or "0" level is recorded is provided at predetermined portions of the data recording area of each track, and upon reproducing the data of the reference data recording area is sampled to extract a level of the data, thereby clamping a reproduced RF signal by the sampled level.

Thus, since plural data such as 2 or 3 bit data representing "1" or "0" level are recorded in each block of the data recording area, the reproduced RF signal of the reference data recording area of each block has a completely saturated level representing a bottom or peak level of the recorded data. Thereafter, the level of the reproduced RF signal is adjusted by an automatic gain controller (AGC) or the like so as to be substantially equal to the conversion range or dynamic range of an A/D converter, then the reproduced RF signal is clamped at the reproduced signal level of the reference data recording area, whereby the digital signal delivered from the A/D converter will be a signal which is obtained by effectively and fully utilizing the dynamic range of the A/D converter, thereby decreasing bit error rate of the reproduced data.

The preceding and other objects, features, and advantages of the present invention will become apparent from the following detailed description of an illustrative embodiment thereof when read in conjunction with the accompanying drawings, in which like reference numerals are used to identify the same or similar parts in the several views.

DETAILED DESCRIPTION OF THE PREFERRED EMBODIMENT

Figure 3:
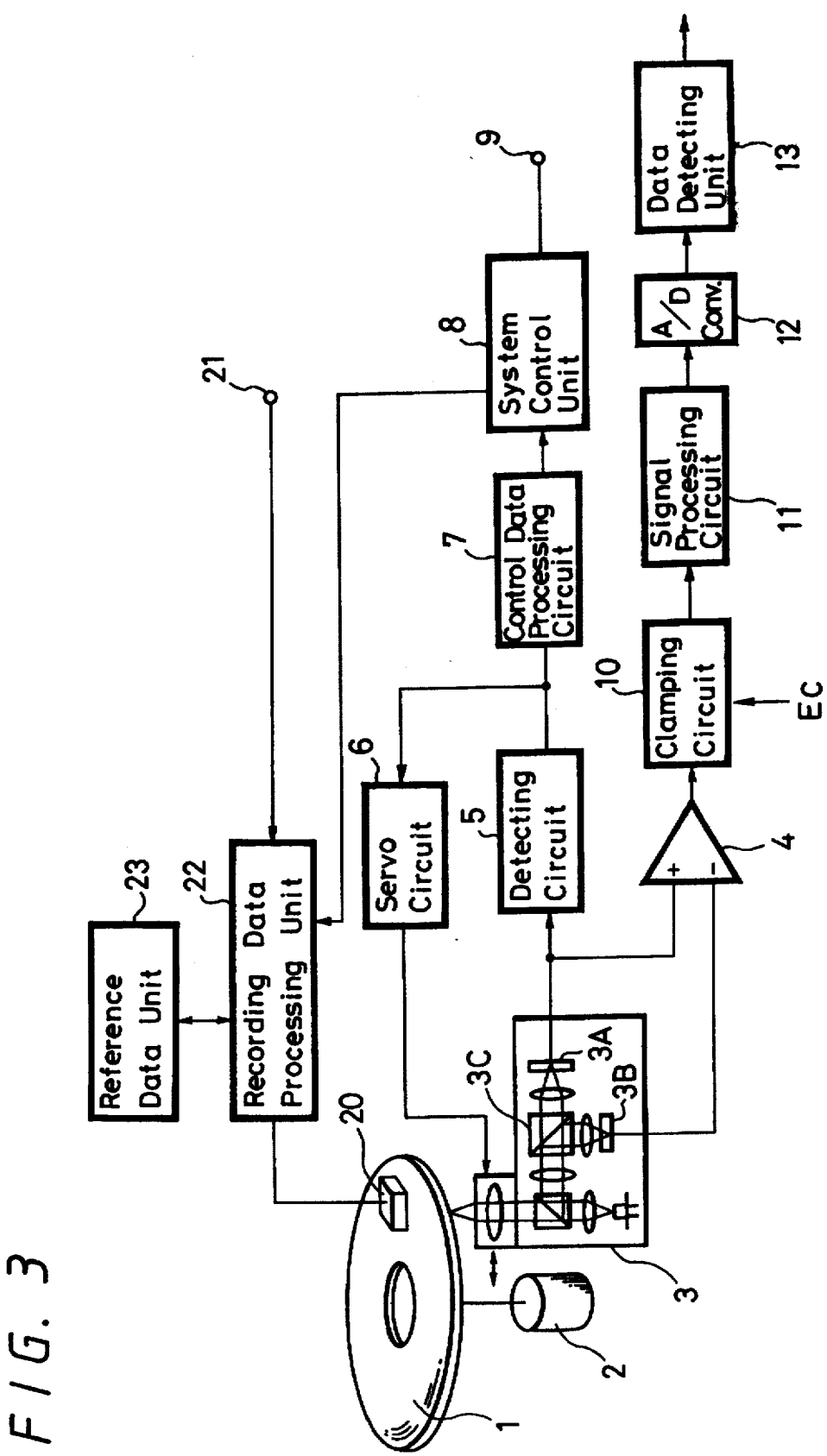
FIG. 3 shows in block form an arrangement of a data recording/reproducing circuit for a magneto-optical disc to which a data recording/reproducing system for a magneto-optical disc according to an embodiment of the present invention is applied.

A data recording/reproducing method for a magneto-optical disc according to an embodiment of the present invention will hereinafter be described with reference to FIGS. 3 through 5. FIG. 3 shows in block form an arrangement of the data recording/reproducing circuit for a magneto-optical disc to which the data recording/reproducing system for a magneto-optical disc according to the present invention is applied.

Referring to FIG. 3, a magneto-optical disc 1 has tracks which are formatted in the manner as described above. The magneto-optical disc 1 is driven by a spindle motor 2 so as to be rotated at a constant linear velocity (CLV) or a constant angular velocity (CAV).

An optical head 3 for irradiating a laser beam on the disc in recording and reproducing modes is disposed beneath the magneto-optical disc 1.

The optical head 3 is, as well known, constituted by an optical system having a laser beam source, a collimator lens, a beam splitter, and a two-axis driving mechanism for controlling an objective lens or the like. The optical head 3 further includes a polarizing beam splitter and a photo detector for detecting a reflected laser beam from the magneto-optical disc.

The reflected beam is divided into a p-polarized light component and a s-polarized light component by a polarizing beam splitter 3C, and the p- and s-polarized light components are detected by two detectors 3A and 3B, respectively.

Output signals of the detectors 3A and 3B are supplied to non-inverted and inverted inputs of a differential amplifier 4, respectively, which in turn outputs a signal representing the difference between the outputs of the detectors 3A and 3B, whereby a reproduced RF signal of the data recorded on the magneto-optical disc is extracted.

The detector 3A is constituted by a light receiving element or photo detector having, for example, a splitted surface. A push-pull signal from the detector 3A is extracted by a detecting circuit 5, which thereby forms various servo signals and supplies the same to a servo circuit 6 and a control data processing circuit 7. The servo circuit 6 drives the two-axis driving mechanism in response to the servo signals to perform a tracking servo and a focusing servo. The control data processing circuit 7 forms a clock signal or the like in accordance with the servo signal and supplies the clock signal to a system control unit 8.

A clamping circuit 10, as explained later in detail, clamps the reproduced RF signal read out from the magneto-optical disc 1 by a clamping voltage Ec applied thereto to thereby remove a DC offset component superimposed on the reproduced RF signal so that, for example, the "0" level (low level) of the reproduced RF signal becomes a constant voltage.

A signal processing unit 11, provided at the front stage of an analog-to-digital converter 12, includes an automatic gain control (AGC) circuit for controlling an amplitude of the reproduced RF signal.

While in FIG. 3 the clamping circuit 10 is arranged in the front stage of the signal processing circuit 11, the signal processing circuit 11 may be arranged in the front stage of the clamping circuit 10.

An output signal of the A/D converter 12 is supplied to a data detecting unit 13 constituted by digital circuits, which in turn picks up the recorded data and reproduces a lead clock or the like by a code conversion and differential system, for example.

A magnetic head unit 20 is provided opposite to the optical head 3 through the magneto-optical disc 1 so as to apply a magnetic field which is inverted in accordance with recording data to the disc 1. Namely, the recording data supplied from an input terminal 21 is subjected to a predetermined code modulation processing and a blocking processing and then added with an error correction code or the like in a recording data processing unit 22, and thereafter the recording data is supplied to the magnetic head 20 as the data to be recorded on the disc 1.

Figure 1:
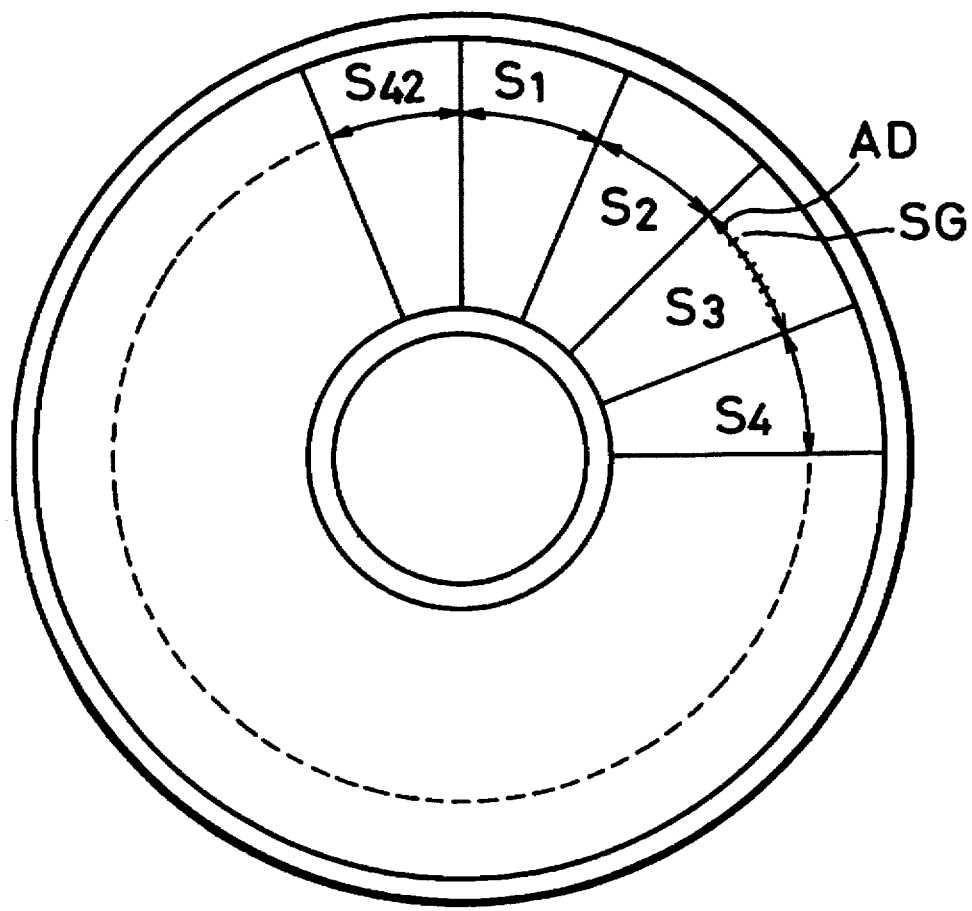
FIG. 1 shows a schematic diagram of a magneto-optical disc used to explain an example of a format formed thereon.
Figure 2:
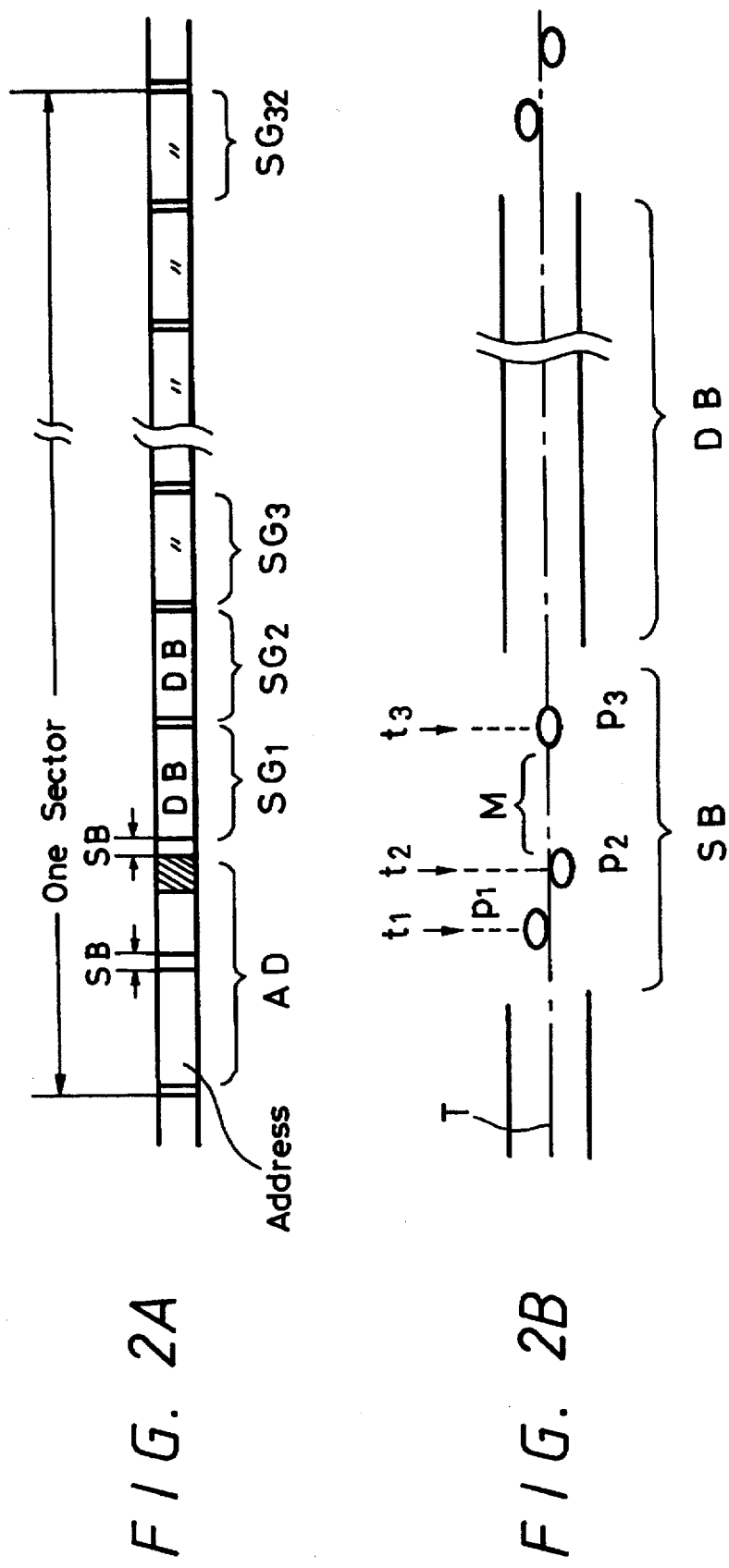
FIGS. 2A and 2B show schematic diagrams illustrating a data pattern of a record track formed on the disc.

In the data recording/reproducing system for a magneto-optical disc according to the present invention, the recording data processing unit 22 is supplied with a signal of, for example, "0" level from a reference data unit 23 in the signal processing process so that "0" bit data corresponding to 2 clocks is added at a head portion of the recording data which is to be recorded as the data byte DB in each of the segments shown in FIG. 2B.

The reference data unit 23 may be included in the data processing unit 22 in actual practice.

Thus, a head portion of each of the data bytes DBs in the each segment is magnetized to be "0" in the corresponding portion of the recording layer to thereby form a reference data recording area RA, and then the succeeding recording data is recorded on an area succeeding to the area RA as the data byte DB.

Figure 4:
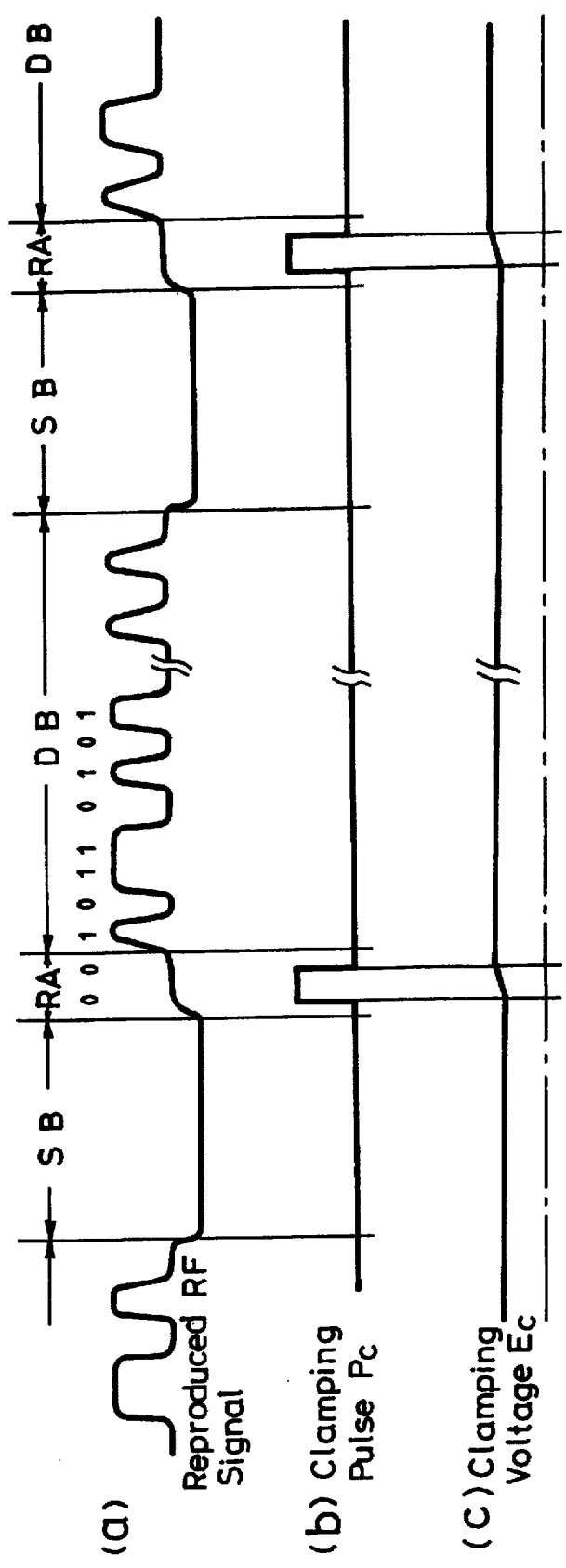
FIG. 4(a –c) shows a waveform diagrams illustrating the relationship among a reproduced RF signal, a clamping pulse and a clamping voltage.

(a) of FIG. 4 shows a waveform of the reproduced RF signal which is obtained by reproducing the recorded data of the segments. As clear from (a) of FIG. 4, the servo byte SB is followed by the reference data recording area RA of 2 clocks which precedes the data byte DB, so that the head portion of the reproduced RF signal represents a saturation level of "0", for example.

Upon reproducing, when the reproduced RF signal of the reference data recording area RA is sampled and held in response to a clamping pulse Pc (see (b) of FIG. 4) formed by the clock signal, the clamping voltage Ec representing a bottom value of the reproduced RF signal is obtained (see (c) of FIG. 4).

The clamping circuit 10 shown in FIG. 3 clamps the reproduced RF signal by the clamping voltage Ec to convert the reproduced RF signal into a signal having a constant bottom value. The thus converted reproduced RF signal is controlled in its amplitude by the signal processing unit 11. The amplitude control is performed in a manner that the bottom and peak values of the converted reproduced RF signal become about 0.2V and 1.8V, respectively, when the dynamic range of the A/D converter 12 is in a range of from 0V to 2V, for example.

Thus, the amplitude of the digital signal delivered from the A/D converter 12 will be within the effective range or the dynamic range thereof, and the digital signal will be a signal which is obtain by effectively and fully utilizing the dynamic range of the A/D converter 12. Therefore, the accuracy of the analog-to-digital conversion becomes high and the data extraction is performed accurately in the succeeding data detecting unit 13, so that the bit error rate of the reproduced data can be decreased.

Figure 5:
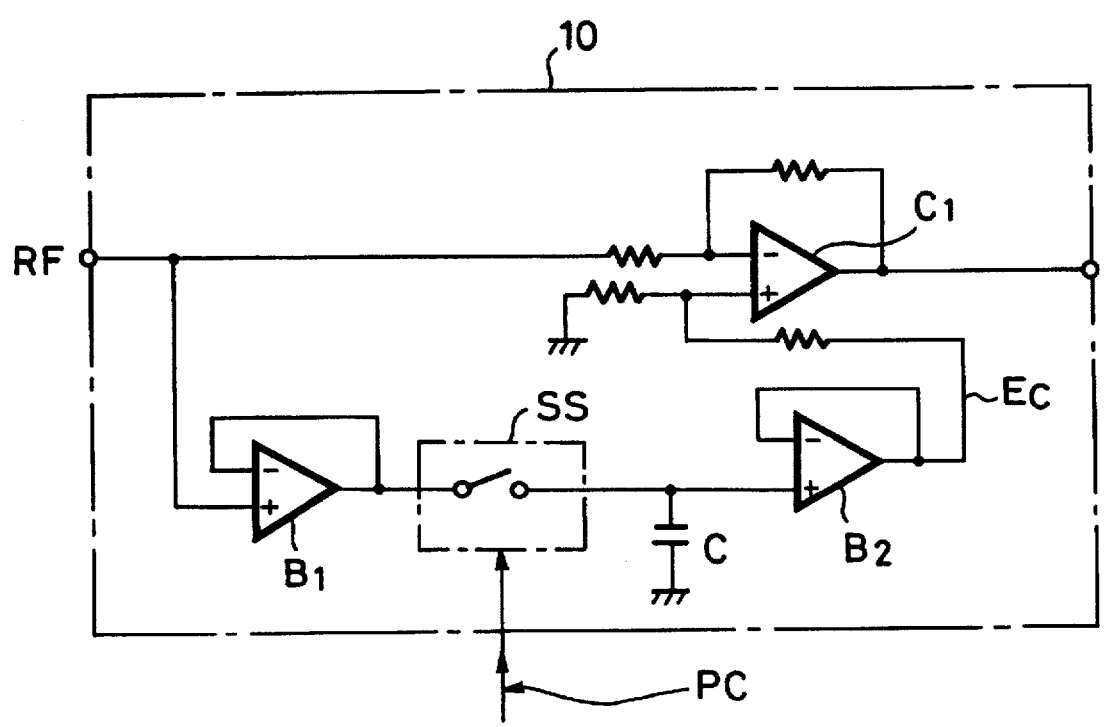
FIG. 5 is a circuit diagram showing an example of a clamping circuit shown in FIG. 3.

FIG. 5 shows an example of the clamping circuit 10. Referring to FIG. 5, the clamping circuit 10 has buffer amplifiers B1, B2, a sampling switch SS, a holding capacitor C, and a comparator C1.

The sampling switch SS is supplied with the clamping pulse Pc ((b) of FIG. 4) for extracting the signal of the reference data recording area RA so that the switch SS is closed or turned on only during the application of the clamping pulse Pc. Thus, the clamping voltage Ec shown in (c) of FIG. 4 appears at the output of the amplifier B2 through the capacitor C. During the application of the pulse Pc, the clamping voltage Ec increases at a suitable time constant and is applied to the comparator C1, whereby the bottom value of the reproduced RF signal is set to a constant reference level.

While, in the above-described embodiment, the "0" level data of 2 clocks is recorded on the reference data recording area RA, "0" level data of 3 clocks may be recorded on the area.

Further, although the foregoing has described the recording of "0" level data, "1" level (high level) data may be recorded on the reference data recording area RA so that the reproduced RF signal is clamped so as to be constant in its peak level by clamping the "1" level data of the area RA.

Furthermore, although in the above-described embodiment, the reference data recording area is provided at the head portion of the data byte DB, it may be provided at the center portion or the end portion of the data byte DB or the like. In this case, a timing of the clamping pulse Pc may be adjusted so as to clamp the data of the area RA.

As set out above, according to the present invention, since a reference data recording area is provided at a predetermined area of the recording data area so that, upon recording, "0" or "1" level data of several bits is recorded on the area and, upon reproducing, the clamping level of the reproduced RF signal is set in accordance with the sampled data of the reference data recording area, it is possible to accurately digitize the reproduced RF signal even if the data disc is of a type wherein a DC component is superimposed on the reproduced RF signal.

Further, since a DC free circuit such as the AC amplifier can be employed in the reproducing system, the data detection can be less influenced by the offset components of the optical system and the circuits, so that the design of the circuit arrangement can be facilitated.

Furthermore, in the magneto-optical disc wherein the track is completed by sectors, the reproduced signal is likely fluctuated on a DC level unit basis upon reproducing. However, this problem can be eliminated by employing the data recording/reproducing system of the present invention.

Having described the preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. A system of recording/reproducing data on and from a spiral or concentric track formed on a magneto-optical disc having a plurality of sectors each including an address data area and a reference data recording area, wherein the reference data recording area is divided into a plurality of blocks, said system comprising:

means for providing the reference data recording area in an upper stream of each of said blocks, in which reference data consisting of continuous bit data indicative of one of a high and a low level are recorded;

means for generating a radio frequency signal representative of the recorded reference data;

means for adjusting an amplitude of the radio frequency signal to substantially coincide with a conversion range of an analog-to-digital converter;

means for clamping the amplitude adjusted radio frequency signal to correspond to a clamping level which is obtained from the recorded reference data; and means for converting the clamped amplitude adjusted radio frequency signal into digital data, said means for converting including the analog-to-digital converter.

2. The system according to claim 1, wherein said reference data recording area is provided at a head portion of each of said blocks.

3. A system of recording/reproducing data on and from a spiral or concentric track formed on a magneto-optical disc having a plurality of sectors each including an address data area and a reference data recording area, wherein the reference data recording area is divided into a plurality of blocks, said system comprising:

means for providing the reference data recording area in an upper stream of each of said blocks, in which reference data consisting of continuous bit data indicative of one of a high and a low level are recorded;

means for generating a radio frequency signal representative of the recorded reference data;

means for clamping the radio frequency signal to correspond to a clamping level which is obtained from the recorded reference data;

means for adjusting an amplitude of the clamped radio frequency signal to substantially coincide with a conversion range of an analog-to-digital converter; and means for converting the amplitude adjusted clamped radio frequency signal into digital data, said means for converting including the analog-to-digital converter.

4. The system according to claim 3, wherein said reference data recording area is provided at a head portion of each of said blocks.

5. A system of recording/reproducing data on and from a spiral or concentric track formed on a magneto-optical disc having a plurality of sectors each including an address data area and a reference data recording area, wherein the reference data recording area is divided into a plurality of blocks, said system comprising:

means for providing the reference data recording area in an upper stream of each of said blocks, in which reference data consisting of continuous bit data indicative of one of a high and a low level are recorded;

means for generating a radio frequency signal representative of the recorded reference data;

means for adjusting an amplitude of the radio frequency signal to substantially coincide with a conversion range of an analog-to-digital converter;

means for clamping the amplitude adjusted radio frequency signal to correspond to a clamping level which is obtained from the recorded reference data, said means for clamping including a first buffer amplifier, a second buffer amplifier, a comparator and a switch means, the first buffer amplifier having an input coupled to receive the radio frequency signal from the means for adjusting, the switch means operative to couple an output of the first buffer amplifier to a time constant delayed input of the second buffer amplifier for the duration of a clamping pulse, the comparator having a first input coupled to receive the amplitude adjusted radio frequency signal from the means for adjusting, the comparator operative to clamp the radio frequency signal in response to a clamping voltage provided to a second input of the comparator from an output of the second buffer amplifier; and means for converting the clamped amplitude adjusted radio frequency signal into digital data, said means for converting including the analog-to-digital converter.

6. A system of recording/reproducing data on and from a spiral or concentric track formed on a magneto-optical disc having a plurality of sectors each including an address data area and a reference data recording area, wherein the reference data recording area is divided into a plurality of blocks, said system comprising:

means for providing the reference data recording area in an upper stream of each of said blocks, in which reference data consisting of continuous bit data indicative of one of a high and a low level are recorded;

means for generating a radio frequency signal representative of the recorded reference data;

means for clamping the radio frequency signal to correspond to a clamping level which is obtained from the recorded reference data said means for clamping including a first buffer amplifier, a second buffer amplifier, a comparator and a switch means, the first buffer amplifier having an input coupled to receive the radio frequency signal from the means for generating, the switch means operative to couple an output of the first buffer amplifier to a time constant delayed input of the second buffer amplifier for the duration of a clamping pulse, the comparator having a first input coupled to the radio frequency signal from the means for generating, the comparator operative to clamp the radio frequency signal in response to a clamping voltage provided to a second input of the comparator from an output of the second buffer amplifier;

means for adjusting an amplitude of the clamped radio frequency signal to substantially coincide with a conversion range of an analog-to-digital converter; and means for converting the amplitude adjusted clamped radio frequency signal into digital data, said means for converting including the analog-to-digital converter.

* * * * *